(12) United States Patent
Richards et al.

(10) Patent No.: US 10,915,148 B1
(45) Date of Patent: *Feb. 9, 2021

(54) DYNAMIC DISTORTION CORRECTION FOR OPTICAL COMPENSATION

(71) Applicant: Facebook Technologies, LLC, Menlo Park, CA (US)

(72) Inventors: Evan M. Richards, Fremont, CA (US); Brant Carlton Lewis, San Carlos, CA (US); Youngshik Yoon, Cupertino, CA (US); Shizhe Shen, Foster City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,110

(22) Filed: Dec. 13, 2019

Related U.S. Application Data (60) Continuation of application No. 16/234,284, filed on Dec. 27, 2018, now Pat. No. 10,551,879, which is a division of application No. 15/611,720, filed on Jun. 1, 2017, now Pat. No. 10,241,545.

(51) Int. Cl.
*G06F 1/16* (2006.01)
*G06F 3/01* (2006.01)

(52) U.S. Cl.
CPC .......... *G06F 1/1675* (2013.01); *G06F 1/163* (2013.01); *G06F 1/1637* (2013.01); *G06F 1/1686* (2013.01); *G06F 3/013* (2013.01)

(58) Field of Classification Search
CPC ...... G06F 1/1675; G06F 1/163; G06F 1/1637; G06F 1/1686; G06F 3/013; G06T 5/006; G02B 27/0093; G02B 27/017; G02B 27/0172; G02B 2027/011; G02B 2027/014; G02B 2027/0178; G02B 2027/0187

See application file for complete search history.

(56) References Cited

U.S. PATENT DOCUMENTS

| | | |
|---|---|---|
| 10,082,865 B1 | 9/2018 | Raynal et al. |
| 2006/0018550 A1 | 1/2006 | Rash et al. |
| 2008/0062164 A1 | 3/2008 | Bassi et al. |
| 2015/0222883 A1 | 8/2015 | Welch |
| 2016/0091720 A1 | 3/2016 | Stafford et al. |
| 2017/0160798 A1 | 6/2017 | Lanman et al. |
| 2017/0161951 A1 | 6/2017 | Fix et al. |
| 2017/0169747 A1 | 6/2017 | Richards et al. |
| 2018/0032103 A1 | 2/2018 | Eskilsson et al. |
| 2018/0114298 A1 | 4/2018 | Malaika et al. |

*Primary Examiner* — John R Schnurr
(74) *Attorney, Agent, or Firm* — Fenwick & West LLP (57) ABSTRACT

A distortion calibration system generates a distortion map for a head-mounted display (HMD). The system includes a camera that takes pictures of a test pattern displayed by the HMD. The images are taken at different camera positions and/or states of the HMD. The system determines a distortion map using the captured images, and uploads it to the HMD as part of, e.g., an optical model. The HMD comprises an electronic display, an eye tracking unit, an optics block, and a module. The module estimates distortion values based on eye tracking information from the eye tracking unit, an optical model, and a state of the HMD (e.., a distance between the optics block and the electronic display). The module determines an adjusted state of the HMD using the estimated distortion values, the eye tracking information, and the optical model, and adjusts the state of the HMD to the adjusted state.

20 Claims, 6 Drawing Sheets

DYNAMIC DISTORTION CORRECTION FOR OPTICAL COMPENSATION

CROSS REFERENCE TO RELATED APPLICATIONS

This application is a continuation of co-pending U.S. application Ser. No. 16/234,284, filed Dec. 27, 2018, which is a division of U.S. application Ser. No. 15/611,720, filed Jun. 1, 2017, now U.S. Pat. No. 10,241,545, each of which is incorporated by reference in its entirety.

BACKGROUND

The present disclosure generally relates to dynamic distortion correction, and specifically relates to using eye tracking to detect and correct image distortions observed by a user of a head-mounted display (HMD).

A HMD conventionally include lenses that direct an image from a display to a user of the HMD. Optical distortion caused by one or more of the lenses may impair user experience when operating a HMD. Solutions are needed to reduce the occurrence of distortions in the images displayed by HMDs. One solution for correcting distortions in a HMD is to use optically perfect lenses. However, a completely perfect lens may not be possible to manufacture, and if manufacturable, is generally prohibitively expensive to use in a HMD.

SUMMARY

A head mounted display (HMD) comprises an electronic display, an eye tracking unit, an optics block, and a distortion correction module. The HMD may be, e.g., a virtual reality (VR) system, an augmented reality (AR) system, a mixed reality (MR) system, or some combination thereof. In some embodiments, a state of the electronic display panel and/or optics block may be adjusted to adjust a location at which an image is presented to the user. The state of the display panel describes a position of the electronic display relative to other elements of the HMD. A state of the optics block is the position of the optics block relative to other elements of the HMD. The state of the HMD includes both the state of the optics block and the state of the electronic display.

The distortion correction module is configured to estimate distortion in the images viewed by the user, and to adjust the HMD to correct the estimated distortion. The distortion correction module estimates one or more distortion values based in part on eye tracking information determined by the eye tracking unit, an optical model, and a state of the HMD. There are multiple embodiments of the optical model used in the estimation of the one or more distortion values. Two examples are a distortion map and a ray-tracing program. The ray-tracing program dynamically determines distortion values using the eye tracking information and the state of the HMD. The distortion map is a look-up table that uses the eye tracking information and the state of the HMD to determine distortion values. Generation of the distortion map is discussed in greater detail below.

The distortion correction module determines an adjusted state of the HMD to reduce the distortion values below some threshold value. The distortion correction module determines the adjusted state by determining what state of the HMD in the optical model results in distortion values being below one or more threshold values given an eye position. In some embodiments, the HMD may then adjust its state to reduce one or more of the distortion values below their corresponding threshold values. In some embodiments, the images displayed by the electronic display may be pre-distorted to decrease the estimated distortion.

In some embodiments, a distortion map described above is generated by a distortion calibration system. The distortion calibration system comprises a test mount, a camera assembly, and a calibration workstation. The test mount is configured to receive a head mounted display (HMD) under test, and hold the HMD under test as it presents a test pattern in accordance with calibration instructions. The camera assembly includes one or more cameras, and is configured to capture, for different positions of the one or more cameras, one or more images of the test pattern presented by the electronic display through the optics block in accordance with the calibration instructions. The calibration workstation generates the calibration instructions, and provides the calibration instructions to the HMD under test and the camera assembly. The calibration workstation calculates calculate distortion values for each of the different camera positions using the captured images. The calibration workstation generates a distortion map using the calculated distortion values and the camera positions, and provides the distortion map to the HMD under test.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
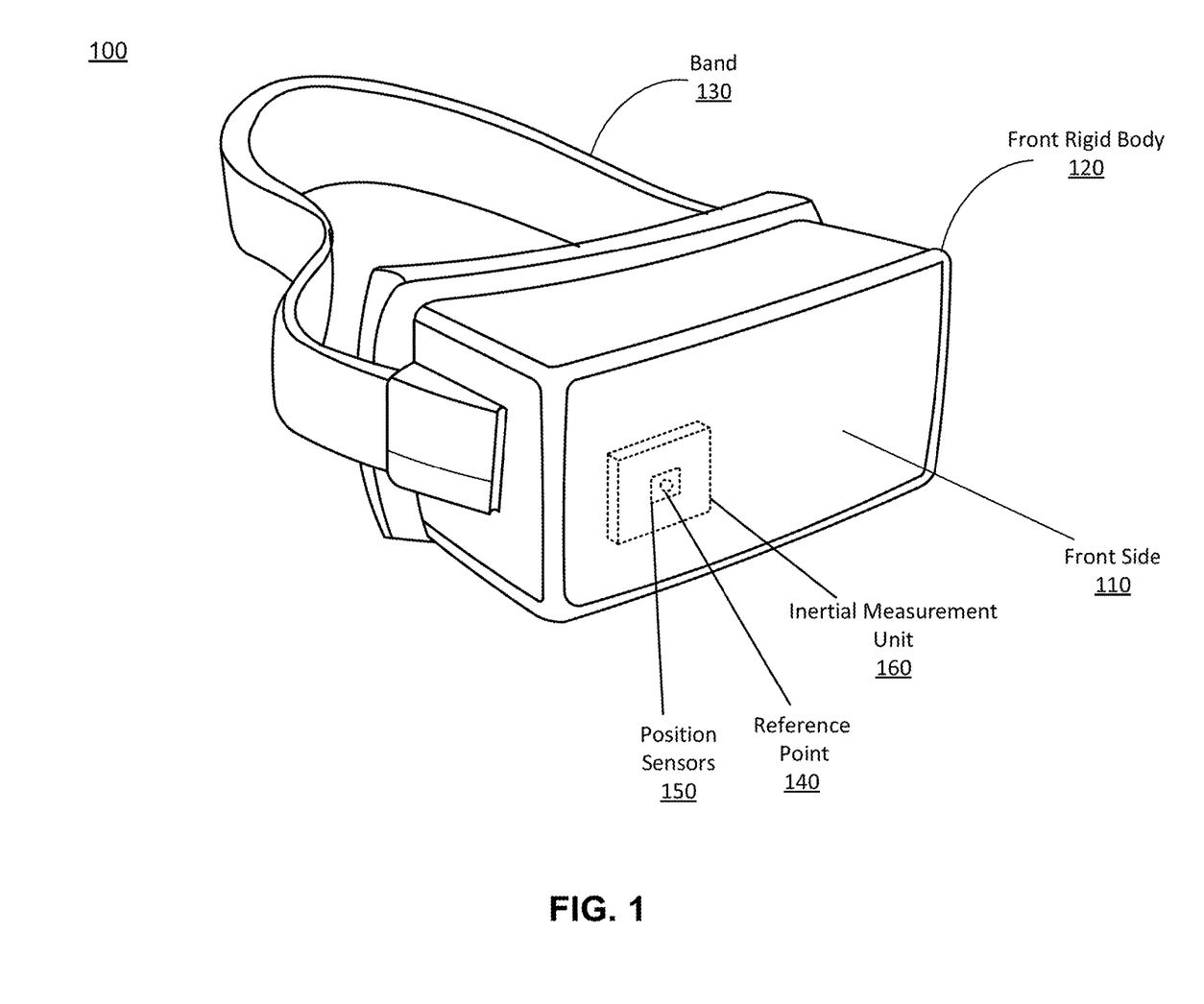
FIG. 1 is a wire diagram of a HMD, in accordance with an embodiment.

FIG. 1 is a wire diagram of a head-mounted display (HMD) headset, in accordance with an embodiment. The HMD 100 includes a front side 110, a front rigid body 120, and a band 130. The front rigid body 120 also includes an IMU 160, the one or more position sensors 150, and a reference point 140. In the embodiment shown by FIG. 1, the position sensors 150 are located within the IMU 160, and neither the IMU 160 nor the position sensors 150 are visible to a user of the HMD 100. The HMD 100 may be part of, e.g., a VR system, an AR system, a MR system, or some combination thereof. In embodiments that describe AR system and/or a MR system, portions of the HMD 100 that are between a front side 110 of the HMD 100 and one or more eyes of the user are at least partially transparent (e.g., a partially transparent display panel).

The HMD 100 also includes one or more eye tracking units (not shown) that are used to determine the eye tracking information for the one or more eyes of the user. In some embodiments, the one or more eye tracking units are located in the interior of the HMD 100. In alternate embodiments, the one or more eye tracking units may be co-located with a display panel of the HMD 100 (e.g., may be part of the same device). Some embodiments of the eye tracking units include a light emitter and a camera.

Figure 2:
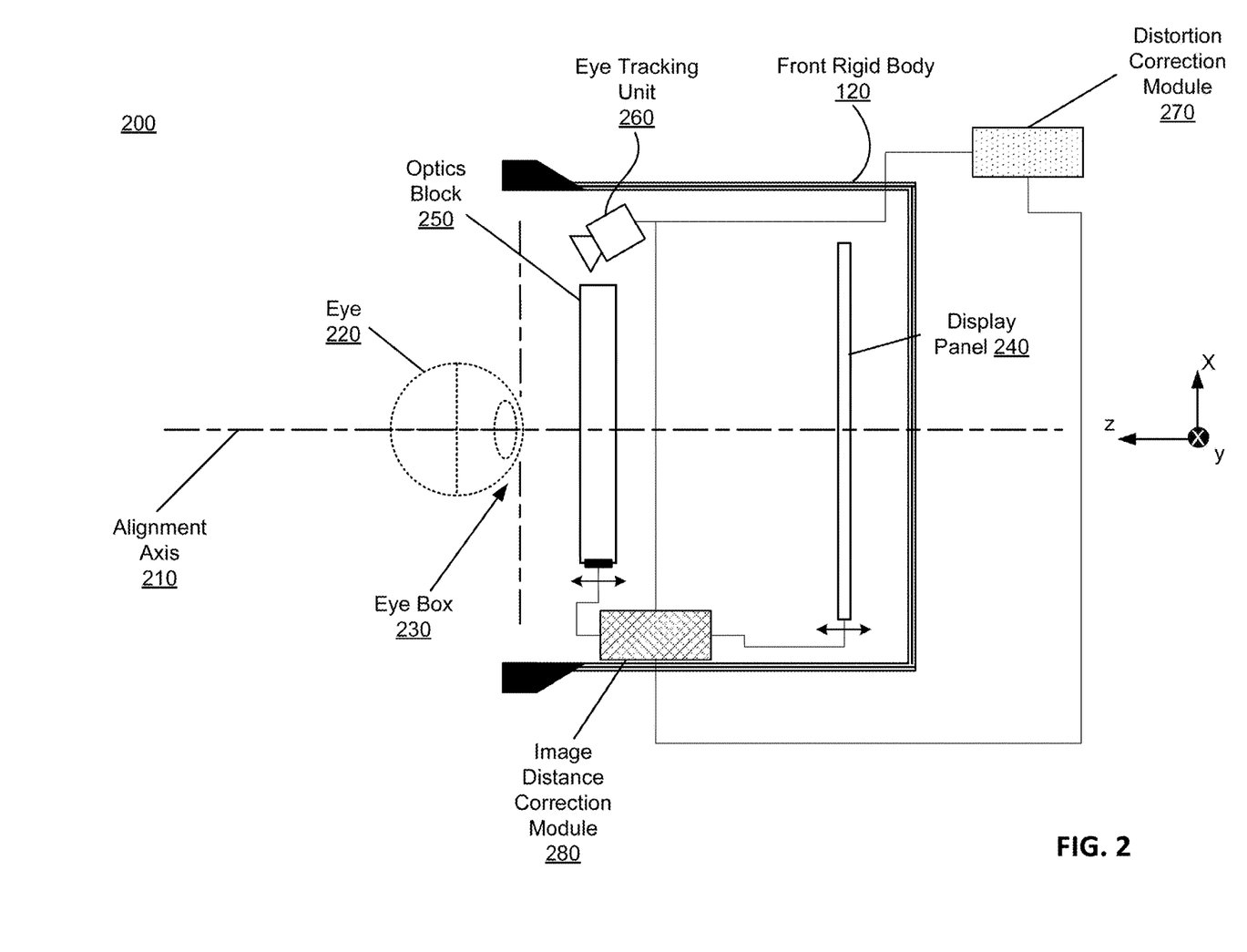
FIG. 2 is a cross section of a front rigid body of the HMD in FIG. 1, in accordance with one embodiment.

FIG. 2 is a cross section 200 the front rigid body 120 of the embodiment of the HMD 100 shown in FIG. 1. The front rigid body 120 includes a display panel 240, an optics block 250, and an eye tracking unit 260. Some embodiments of the front rigid body 120 have different components than those described here. Similarly, in some cases, functions can be distributed among the components in a different manner than is described here.

For purposes of illustration, FIG. 2 shows a cross section of the front rigid body 120 in accordance with a single eye 220 being tracked by the single eye tracking unit 260. Although FIG. 2 depicts a center cross-section of the eye 220 as being in the same plane as the eye tracking unit 260, the center cross-section of the eye 220 and the eye tracking unit 260 do not have to be in the same plane. Additionally, another display panel 240, optics block 250, and eye tracking unit 260 separate from those shown in FIG. 2, may be included in the front rigid body 120 to present content, such as an augmented representation of a local area or virtual content, to another eye of the user. In alternative embodiments, the eye tracking unit 260 may be positioned to view the eye 220 through the optics block 250. In such embodiments, the eye tracking unit 260 takes into account magnification, aberration, and any other optical effects produced by the optics block 250.

The display panel 240 presents media that emits visible light toward the eye 220 located at an eye box 230. The eye box 230 is a region in space that is occupied by the eye 220. In various embodiments, the display panel 240 may comprise a single display panel or multiple display panels (e.g., a display panel for each eye of a user). Examples of the display panel 240 include: a liquid crystal display (LCD), an organic light emitting diode (OLED) display, an active-matrix organic light-emitting diode display (AMOLED), some other display, or some combination thereof. Additionally, the display panel 240 may be associated with one or more optical components correcting one or more types of optical error (e.g., field curvature, astigmatism, barrel distortion, pincushion distortion, mustache distortion, chromatic aberration, chromatic aberration, etc.). For example, the display panel 240 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the display panel 240. In some embodiments, the media provided to the display panel 240 for presentation to the user is pre-distorted to aid in correction of one or more types of optical errors. Pre-distortion of media provided to the display panel 240 is discussed in greater detail below. Additionally, in some embodiments, a state of the display panel 240 may be adjusted to adjust a location at which an image is presented to the user. The state of the display panel 240 is the position of the display panel 240 relative to other elements of the HMD 200. Thus adjustment of the state of the display panel 240 comprises adjusting the position of the display panel 240, and is discussed in great detail below. In general, state information is position information for elements of the HMD 200, including but not limited to the display panel 240. Additional embodiments of state information for additional elements of the HMD 200, such as the optics block 250, are discussed below.

The optics block 250 directs light emitted by the display panel 240 to the eye box 230 for presentation to the user. The optics block 250 includes one or more optical elements. An optical element may be an aperture, a Fresnel lens, a convex lens, a concave lens, a filter, a hot mirror, etc. Moreover, the optics block 250 may include combinations of different optical elements. In some embodiments, one or more of the optical elements in the optics block 250 may have one or more coatings, such as anti-reflective coatings. The optics block 250 can magnify the light, and in some embodiments, also corrects for one or more additional optical errors (e.g., distortion, astigmatism, etc.). In some embodiments, a state of one or more optical elements in the optics block 250 may be adjusted to adjust a location at which an image is presented to the user. The state of the optics block 250 is the position of the optics block 250 relative to other elements of the HMD 200. Thus adjustment of the state of the optics block 250 comprises adjusting the position of the optics block 250, and is discussed in great detail below. As noted above, state information is position information for elements of the HMD 200, including but not limited to the optics block 250.

The eye tracking unit 260 tracks the position of the eye 220 to generate eye tracking information. In some embodiments, the eye tracking unit 260 includes one or more emitters to illuminate the eye 220 with light and a camera to capture images of the eye 220. The emitters may be, e.g., light emitting diodes (LEDs), laser diodes, or some other light source. An emitter may emit light in a visible band (i.e., ~380 nm to 750 nm), in an infrared (IR) band (i.e., ~750 nm to 1 mm), in an ultraviolet band (i.e., 10 nm to 380 nm), some other portion of the electromagnetic spectrum, or some combination thereof. In some embodiments, the emitters (not shown) are positioned in a ring arrangement that is substantially centered on the alignment axis 210. The camera captures images of the eye. In some embodiments, the eye tracking unit 260 identifies reflections of the emitters visible on the eye 220 in the captures images—also referred to as "glints"—and determines eye tracking information based in part on locations of the glints in the captured images. Eye tracking information is information that describes a position of one or both eyes. Eye tracking information can include, e.g., a location of the eye in space, and orientation of the eye in space, an estimated foveal axis (e.g., based on some combination of an angular orientation of a pupillary axis, a translation of the eye, a torsion of the eye, and a shape of the eye), a gaze angle, a vengeance depth, inter-pupillary distance, an estimated focal depth (e.g., where a gaze angle for each eye intersects), some other information relevant to eye tracking, or some combination thereof.

In some embodiments, some or all of the one or more emitters project a structured light pattern into the eyebox 230. This pattern then projects onto to the eye 220, which may produce a perceived distortion in the structured light pattern when viewed from an offset angle. The eye tracking unit 260 also includes at least one camera which detects the distortions (if any) of the light pattern projected onto the eye 220. A camera, oriented on a different axis than the emitter, captures the illumination pattern on the eye. By detecting the deformation of the illumination pattern on a surface of the eye 220, the eye tracking unit 160 can determine the shape of the eye 220. The captured distorted light pattern is therefore indicative of the 3D shape of the illuminated portion of the eye. The eye tracking unit 160 generates eye tracking information using, e.g., the 3D shape of the portion of the eye illuminated by the one or more emitters. Other techniques for determining the position of the eye 220 may also be used.

To track the eye 220, the eye tracking unit 260 is positioned in a way such that the eye tracking unit 260 has an unobstructed path to the eye 220. This enables the eye tracking unit 260 to capture light reflected from the eye 220 to generate images of the eye 220 (and specifically cornea of the eye 220). As shown in FIG. 2, the eye tracking unit 260 is located above the optics block 250 and the display panel 240. In alternative embodiments, the eye tracking unit 260 may be positioned either on-axis along the user's vision or can be placed off-axis from the user's vision. In alternative embodiments, the eye tracking unit 260 may be positioned to view the eye 220 through the optics block 250. In such embodiments, the eye tracking unit 260 takes into account magnification, aberration, and any other optical effects produced by the optics block 250.

The eye tracking unit 260 includes one or more cameras to capture images of the eye 220. In some embodiments, the eye tracking unit 260 may control how light is emitted from the eye tracking unit 260 and how the eye tracking unit 260 captures light. For example, the eye tracking unit 260 may control properties such as timing, intensity, wavelength range, polarization, field of view limits, and density (in the case of SL) of the eye tracking unit 260. The eye tracking unit 260 may also control the timing of when data is collected from the eye tracking unit 260. Thus, the eye tracking unit 260 can coordinate the capturing of data by the eye tracking unit 260 with light emission by the eye tracking unit 260.

As discussed below with regard to FIGS. 3-5, the eye tracking unit 260 may use a stored model of a generic eye, or a stored model of one or more eyes of the intended user of the HMD for estimating positions of the eye 220. The model stored by the eye tracking unit 260 can be a 3D model which approximates the surface geometry of the eye. More information about a model used for eye tracking is disclosed in U.S. Patent Application No. 62/249,852, hereby incorporated by reference in its entirety.

In further embodiments, the eye tracking unit 260 may generate and/or train a model of a user's eye during a calibration sequence (discussed in greater detail below). Generation of the model of the user's eye that is implemented by the eye tracking unit 260 may involve using the eye tracking unit 260 to repeatedly scan the user's eye. These scans of the user's eye can be interpolated into the model of the user's eye.

An image distance correction module 280 determines state information for one or more of the display panel 240 and the optics block 250. For example, the image distance correction module 280 determines a relative location of the display panel 240 and the optics block 250. Using this state information, the image distance correction module 280 can determine absolute distances between elements of the HMD 100. For example, using the relative locations of the display panel 240 and the optics block 250, the image distance correction module 280 can determine an absolute distance between the display panel 240 and the optics block 250. Once this distance is known, the image distance correction module 280 can determine a virtual image distance, where the virtual image distance is a distance to the virtual image being presented to the user. Note that the functions of the image distance correction module 280 can be performed by other modules of the HMD 100. For example, in some embodiments, the distortion correction module 270 may perform the functions of the image distance correction module 280. The image distance correction module 280 also provides information regarding virtual image distance to, e.g., the distortion correction module 270, a calibration workstation (discussed below), some other module/component of the HMD 100, or some combination thereof.

Eye tracking information for the eye 220 as determined by the tracking unit 260 as well as state information and distance information for the display panel 240 and the optics block 250 as determined by the image distance correction module 280 are provided to a distortion correction module 270. As discussed in detail below, based on the eye tracking information and the state information for one or more of the eye 220, the display panel 240, and the optics block 250, the distortion correction module 270 determines an amount of expected distortion in the presented content. In one embodiment, the distortion correction module 270 determines one or more distortion values. Distortion values are quantitative values that characterize the amount of image distortion perceived by a user of the HMD 100. Examples of optical distortions include field curvature, barrel distortion, mustache distortion, and pincushion distortion.

In some embodiments, such as the embodiment seen in FIG. 2, the distortion correction module 270 may be located outside of the HMD 100 and may remotely determine image distortion values based on eye tracking information and state information for one or more of the eye 220, the display panel 240, and the optics block 250. For example, the distortion correction module 270 may be located within a console of the HMD 100 and send wireless information to the HMD 100 regarding expected image distortion. In further embodiments, the distortion correction module 270 may be split between a plurality of entities associated with the HMD 100. For example, the distortion correction module 270 may be split between the HMD 100 and a console of the HMD 100. In alternative embodiments, some or all of the distortion correction module 270 may be incorporated within the front rigid body 120 of the HMD 100.

There are a plurality of modes of operation that may be used by the distortion correction module 270 to identify image distortions perceived by the eye 220. Furthermore, these same modes of operation allow the distortion correction module 270 to identify states of one or more elements of the HMD 100 that serve to correct this distortion, if the magnitude of one or more calculated distortion values is greater than a specified threshold distortion value. Two such modes of operation include a ray-tracing mode of operation and a distortion map mode of operation, both described in greater detail below. In some embodiments, both the ray-tracing mode of operation and the distortion map mode of operation may be available for use by the distortion correction module 270. In alternative embodiments, the distortion correction module 270 may only operate in a single mode of operation. For example, the distortion correction module 270 may operate only in the ray-tracing mode of operation. As another example, the distortion correction module 270 may operate solely in the distortion map mode of operation. The one or more working modes of operation of the distortion correction module 270 can be specified by a range of sources including by a programmer of the HMD 100, the user of the HMD 100, a computer coupled either remotely or physically to the HMD 100, or through alternative means.

The ray-tracing mode of operation of the distortion correction module 270 uses a ray-tracing program to dynamically determine expected distortion values and to dynamically determine states of one or more elements of the HMD 100 at which the distortion values would be decreased. In other words, the ray tracing program determines, in real time, expected distortion values and states of one or more elements of the HMD 100 at which the distortion values would be decreased. The distortion map mode of operation of the distortion correction module 270 uses a preset, stored distortion map to identify expected distortion values and to determine states of one or more elements of the HMD 100 at which the distortion values would be decreased.

In some embodiments, calibration of the HMD 100 is performed prior to implementation of the ray-tracing mode of operation and the distortion map mode of operation of the distortion correction module 270. The method of calibration of the HMD 100 differs for the ray-tracing mode of operation and the distortion map mode of operation. Calibration of both the ray-tracing mode of operation and the distortion map mode of operation are described below with regard to FIG. 3.

The determined states of one or more elements of the HMD 100 at which distortion values are decreased are sent from the distortion correction module 270 to the image distance correction module 280. Using information, the image distance correction module 280 may adjust the states of one or more elements of the HMD 100 to correct this distortion. For example, the image distance correction module 280 may adjust a position of one or more optical elements in the optics block 250, adjust a position of the display panel 240, or some combination thereof. The image distance correction module 280 may also pre-distort presented content of the display panel 240 in order to correct the expected image distortion.

In some embodiments, such as the embodiment seen in FIG. 2, the image distance correction module 280 may be incorporated within the front rigid body 120 of the HMD 100 and may contain one or more mechanisms such as a gimbal to alter the position of the display panel 240 and the optics block 250 of the HMD 100. In alternative embodiments, some or all of the image distance correction module 280 may be located outside of the HMD 100 and may remotely control a position of the optics block 250 and/or a position of the display panel 240. As mentioned above, the image distance correction module 280 can also instruct pre-distortion of images displayed on the display panel 240 via a physical connection, or remotely. For example, the image distance correction module 280 may be located within a console of the HMD 100 and send wireless instructions to the HMD 100 to pre-distort an image displayed by the display panel 240. In further embodiments, the image distance correction module 280 may be split between a plurality of entities associated with the HMD 100. For example, the image distance correction module 280 may be split between the HMD 100 and a console of the HMD 100.

Figure 3:
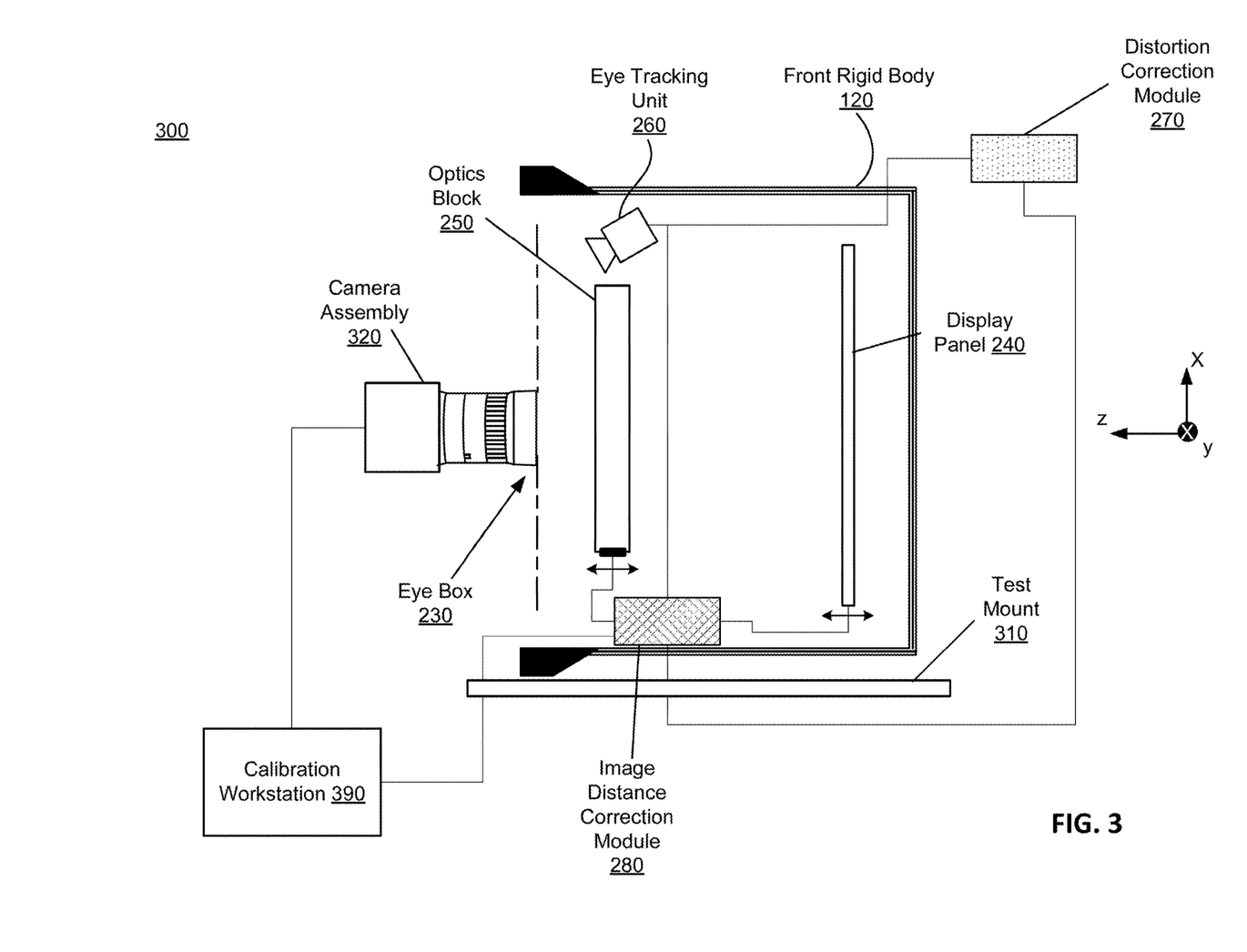
FIG. 3 is a distortion calibration system, in accordance with one embodiment.

FIG. 3 is a distortion calibration system 300, in accordance with one embodiment. Specifically, FIG. 3 depicts an embodiment of calibration of the HMD 100 shown in FIG. 1 for use in the distortion map mode of distortion correction. The distortion calibration system 300 includes a camera assembly 320, a test mount 310, and a calibration workstation 390.

The camera assembly 320 includes one or more cameras. The one or more cameras are coupled to one or more camera mounts (not shown), are configured to engage in rotational and translational motion in accordance with calibration instructions, and are able to move with 6 degrees of freedom. The one or more cameras of the camera assembly 320 are also configured to capture, for different positions of the one or more cameras, one or more images of a test pattern presented by the display panel 240, in accordance with calibration instructions. Operation of the camera assembly 320 is discussed in greater detail below with regard to the calibration workstation 390.

For purposes of illustration, FIG. 3 shows a cross section of the front rigid body 120 in accordance with a single camera of the camera assembly 320 being tracked by the single eye tracking unit 260. Although FIG. 3 depicts a center cross-section of the camera of the camera assembly 320 as being in the same plane as the eye tracking unit 260, the center cross-section of the camera of the camera assembly 320 and the eye tracking unit 260 do not have to be in the same plane. In alternative embodiments, the eye tracking unit 260 may be positioned to view the camera 320 through the optics block 250. In such embodiments, the eye tracking unit 260 takes into account magnification, aberration, and any other optical effects produced by the optics block 250. Additionally, another camera of the camera assembly 320 separate from that shown in FIG. 3 may be placed at another eye box 230 during the calibration phase of the distortion map mode of distortion correction.

The test mount 310 is configured to receive the HMD 100 during calibration of the distortion map mode of distortion correction. Furthermore, the test mount 310 is configured to hold the HMD 100 as it presents a test pattern on the display panel 240 in accordance with calibration instructions. In one embodiment, the test mount 310 is a flat surface. In alternative embodiments, other devices may be used to receive and hold the HMD 100 under test.

The calibration workstation 390 provides instructions for calibration of the distortion map mode of distortion correction. Specifically, the calibration workstation 390 instructs the generation of a distortion map that is used during operation of the HMD in the distortion map mode of operation.

The calibration workstation 390 may be incorporated within the HMD 100, within a console associated with the HMD 100, or within the camera assembly 320. In some embodiments the calibration workstation 390 may be a permanent fixture of the system of the HMD 100. In alternative embodiments the calibration workstation may be a temporary addition used only during the calibration of the distortion map mode of distortion correction.

The calibration workstation 390 controls the camera assembly 320, the display panel 240, and the image distance correction module 280. For example, the calibration workstation 390 can instruct the display panel 240 to display a test pattern image. The calibration workstation 390 can instruct the one or more cameras of the camera assembly 320 to alter their positions. The calibration workstation 390 can also instruct the image distance correction module 280 to alter the position of one or more of the display panel 240 and the optics block 250. Position alteration may include but is not limited to translational motion (forward/back, up/down, left/right) and rotational motion (e.g., pitch, yaw, roll). The calibration workstation 390 instructs the one or more cameras of the camera assembly 320 to capture images of the test pattern image for different positions of the one or more cameras of the camera assembly 320, the display panel 240, the optics block 250, or some combination thereof. The different positions include a plurality of unique combinations of positions of the one or more cameras of the camera assembly 320, the display panel 240, and the optics block 250.

Calibration instructions relayed by the calibration workstation 390 may also include instructions such as the number of pictures to be taken by the one or more cameras of the camera assembly 320. Additional examples of calibration instructions that are not explicitly included here may also be used by the calibration workstation 390.

For a given unique combination of positions of the one or more cameras of the camera assembly 320, the display panel 240, and the optics block 250, the calibration workstation 390 instructs the one or more cameras of the camera assembly 320 to capture one or more images of the display panel 240 according to the calibration instructions provided by the calibration workstation 390. The distortion correction module 270 determines distortion values for the image captured by the one or more cameras of the camera assembly 320 at the particular positions of the one or more cameras of the camera assembly 320, the display panel 240, and the optics block 250. As noted above, distortion values are quantitative values that characterize the amount of image distortion perceived by a user of the HMD 100. The calibration workstation 390 generates an entry in the distortion map containing information describing the positions of the one or more cameras of the camera assembly 320, the display panel 240, and the optics block 250 as specified by the calibration workstation 390, and the corresponding distortion values as determined by the distortion correction module 270. This process of generating distortion map entries is completed for a plurality of unique combinations of positions of the one or more cameras of the camera assembly 320, the display panel 240, and the optics block 250. The calibration phase of the distortion map mode of distortion correction is complete when all such entries are stored within the distortion map.

Note that calibration of the distortion map is specific to the composition and structure of the elements of the HMD 100, as well as to the eye of the user. For example, specifications of the optics block 250 may affect calibration of the distortion map mode of distortion correction. In some embodiments, calibration of the distortion map may be individually performed for each unique HMD during or after the manufacturing phase. In further embodiments, calibration of the distortion map may be performed using a camera assembly 320 formatted to behave similarly to the eye of an intended user. In even further embodiments, calibration of the distortion map may be performed with the intended user of the HMD rather than the camera assembly 320. In some embodiments, the distortion map is stored in a database associated with the HMD 100. In alternative embodiments, the distortion map is stored in a database of a console associated with the HMD 100. In further embodiments, the distortion map is stored in a database directly within the distortion correction module 270. In such embodiments, the database in which the distortion map is stored is a memory such as a ROM, DRAM, SRAM, or some combination thereof. The database may also be part of a larger digital memory of the HMD system.

Calibration of the ray-tracing mode of operation differs from calibration of the distortion map mode of operation. The ray-tracing mode of distortion correction operates in the following manner: using eye tracking information obtained from the eye tracking unit 260 and state information for the display panel 240 and the optics block 250, the distortion correction module 270 uses a ray-tracing program to dynamically determine distortion values under these settings. This is done based on the position of the eye 220 or the camera 320 relative to the optics block 250, and an optical prescription of the optics block 250. The optical prescription of the optics block 250 may or may not include manufacturing defect information, such as distortion and aberration measurements, specific to the individual optics block 250. In some embodiments, such manufacturing defect information may be determined for the individual optics block 250 prior to assembly into the front rigid body 120. Based on these distortion values, the distortion correction module 270 again uses the ray-tracing program to dynamically determine one or more altered states of the elements of the HMD 100 that bring the calculated distortion values below a threshold distortion value.

In some embodiments, specifications of the optics block 250 are referenced during operation of the distortion correction module 270 in the ray-tracing mode of operation. Specifications of the optics block 250 that may be referenced during operation of the ray-tracing mode of distortion correction include focal length, maximum aperture, and dimensions of the optics block 250. Additional specifications of the optics block 250 not explicitly mentioned here may also be referenced during operation of the ray-tracing mode of distortion correction. Specifications of the optics block 250 may be determined by a manufacturer of the HMD 100 or a manufacturer of the optics block 250. Specifications of the optics block 250 may be determined by alternative methods in alternative embodiments. In some embodiments, the specifications of the optics block 250 are stored in a database of the distortion correction module 270. In other embodiments, the specifications of the optics block 250 are stored in another entity associated with the HMD 100 such as a console of the HMD 100. In alternative embodiments, specifications of the optics block 250 are not used during the ray-tracing calculations.

Figure 4:
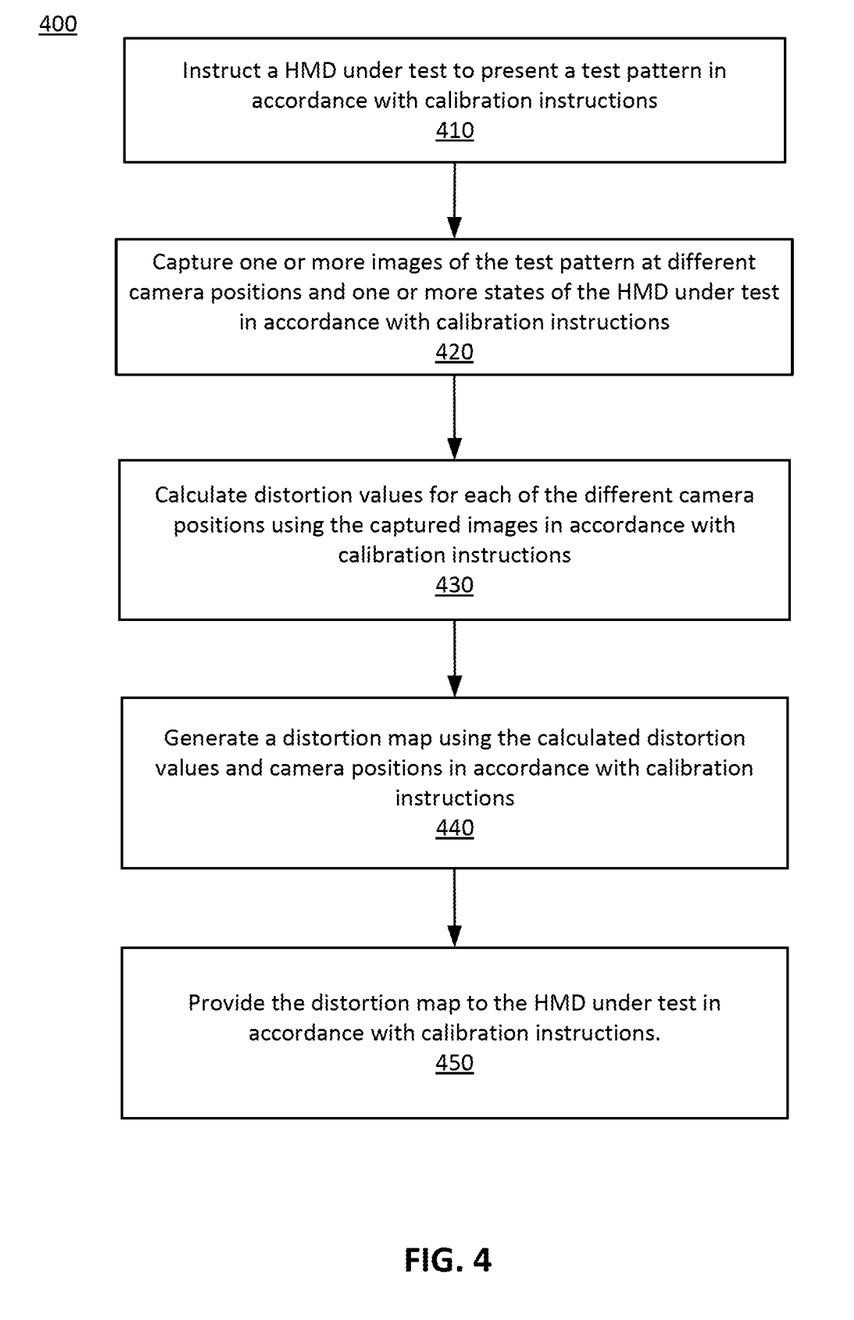
FIG. 4 is a flow chart of a process for calibrating a HMD for a distortion map mode of distortion correction, in accordance with one embodiment.

FIG. 4 is a flow chart of a process 400 for calibrating a HMD for a distortion map mode of distortion correction, in accordance with one embodiment. In one embodiment, the process of FIG. 4 is performed by the distortion calibration system 300. Other entities may perform some or all of the steps of the process in other embodiments. Likewise, embodiments may include different and/or additional steps, or perform the steps in different orders.

The distortion calibration system 300 instructs 410 a HMD under test to present a test pattern in accordance with calibration instructions. As described above, a test pattern is an image displayed by the display panel 240. The test pattern has known feature locations or spacing that enables the distortion calibration system 300 to map the measured position back to the object location on the display panel.

The distortion calibration system 300 captures 420 one or more images of the test pattern at different camera positions for one or more states of the HMD under test in accordance with calibration instructions. The different camera positions simulate potential locations and gaze directions of an eye of a user. In some embodiments, the display panel 240 and/or the optics block 250 are fixed in place, and the one or more cameras of the camera assembly 320 capture one or more images of the test pattern at different positions of the one or more cameras of the camera assembly 320 relative to the HMD. The one or more cameras of the camera assembly 320 capture one or more images of the test pattern presented by the display panel 240, as viewed through the optics block 250, at different positions of the one or more cameras of the camera assembly 320, the display panel 240, and the optics block 250.

The distortion calibration system 300 calculates 430 distortion values for each of the different camera positions using the captured images in accordance with calibration instructions. In other words, the distortion calibration system 300 determines the image distortions produced at the different positions of the one or more cameras of the camera assembly 320 using the images taken by the one or more cameras of the camera assembly 320 in step 420. These captured images are then processed by the distortion calibration system 300 based on the position of features displayed by the display panel 240 and optical characteristics of the camera assembly 320, such as magnification and distortion. Variations from the expected position of the image features, either in spatial or angular position, enable the distortion calibration system 300 to calculate the distortion values as a function of position of the eye box 320.

The distortion calibration system 300 generates 440 a distortion map using the calculated distortion values and camera positions in accordance with calibration instructions. Specifically, the distortion calibration system 300 generates 440 a distortion map using the distortion values calculated in step 430, as well as position data for the one or more cameras of the camera assembly 320, the display panel 240, and the optics block 250. For example, the distortion calibration system 300 may associate each position of the one or more cameras of the camera assembly 320 (corresponding to a potential eye position), state of the optics block, and state of the electronic display panel the corresponding calculated distortion values to generate the distortion map. Accordingly, for a given eye position, the distortion map includes information identifying how distortion values change with state of the optics block and/or the electronic display panel. In some embodiments, the distortion map is the distortion map used by in the distortion map mode of operation of the distortion correction module 270 and discussed in FIG. 3.

The distortion calibration system 300 provides 450 the distortion map to the HMD under test in accordance with calibration instructions. The distortion map can then be used during operation of the HMD to identify and correct expected image distortion based on the positions of one or more of the eye of the user 220, the display panel 240, and the optics block 250.

Figure 5:
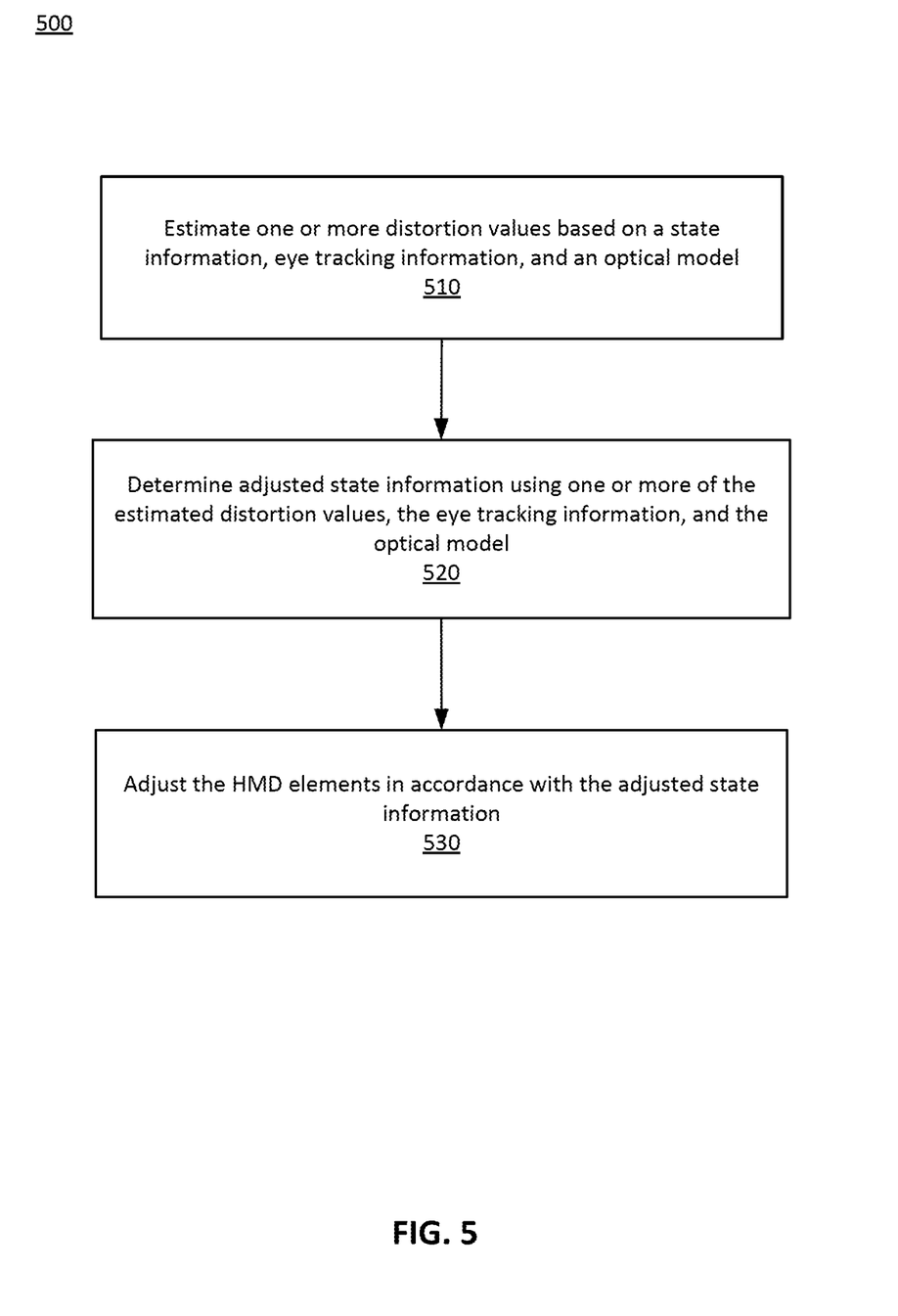
FIG. 5 is a flow chart of a process for dynamic distortion correction, in accordance with an embodiment.

FIG. 5 is a flow chart of a process 500 for dynamic distortion correction, in accordance with an embodiment. In one embodiment, the process of FIG. 5 is performed by an HMD (e.g., the HMD 100). Other entities may perform some or all of the steps of the process in other embodiments. Likewise, embodiments may include different and/or additional steps, or perform the steps in different orders.

The HMD estimates 510 one or more distortion values based on state information, eye tracking information, and an optical model. As previously mentioned, state information is position information for one or more elements of the HMD, including but not limited to the display panel 240 and the optics block 250. Eye tracking information provides information describing the position of the eye 220 of the user. Eye tracking information is determined by the eye tracking unit 260. Finally, the optical model is the optical model of the distortion correction system. In one embodiment, the optical model may be the distortion map described in FIG. 4.

The HMD determines 520 adjusted state information using one or more of the estimated distortion values, the eye tracking information, and the optical model. In other words, The HMD identifies an adjustment of one or more of the elements of the HMD that reduce the distortion estimated in step 510 such that is below some threshold value (e.g., less than 0.05% barrel distortion). For example, the HMD 20 may use the model to determine given a position of user's eye (or both eyes) what state of the optics block 250 and/or the display panel 240 result distortion values being less than the threshold value. And in some cases, the HMD may use the model to determine given a position of user's eye (or both eyes) what state of the optics block 250 and/or the display panel 240 result in minimum distortion values. In embodiments where the positions of the optics block 250 and the display panel 240 are not adjustable, the HMD may identify what distortion values are associated with a position of the eye (or predicted position of the eye), and pre-distorts media displayed by the display panel 240 to offset distortion that would otherwise take place for the given eye position. In some embodiments, step 520 is performed only if the distortion values estimated in step 510 are greater than a threshold distortion value.

Depending upon the mode of operation of the HMD (e.g., the ray-tracing mode of distortion correction or the distortion map mode of distortion correction), steps 510 and 520 may be performed in different ways. In the ray-tracing mode of distortion correction, a ray-tracing program may be used to dynamically estimate 510 distortion values and dynamically determine 520 adjusted state information for one or more elements of the HMD. In the distortion map mode of distortion correction, a distortion map generated according to the steps listed in FIG. 4 may be used to estimate 510 distortion values and determine 520 adjusted state information for one or more elements of the HMD.

The HMD elements are adjusted 530 in accordance with the adjusted state information. In other words, the positions of one or more of the elements of the HMD, including but not limited to the optics block 250 and the display panel 240, are adjusted according to the adjusted state information determined in step 520. In addition, media displayed by the display panel 240 may be pre-distorted, as discussed above.

Figure 6:
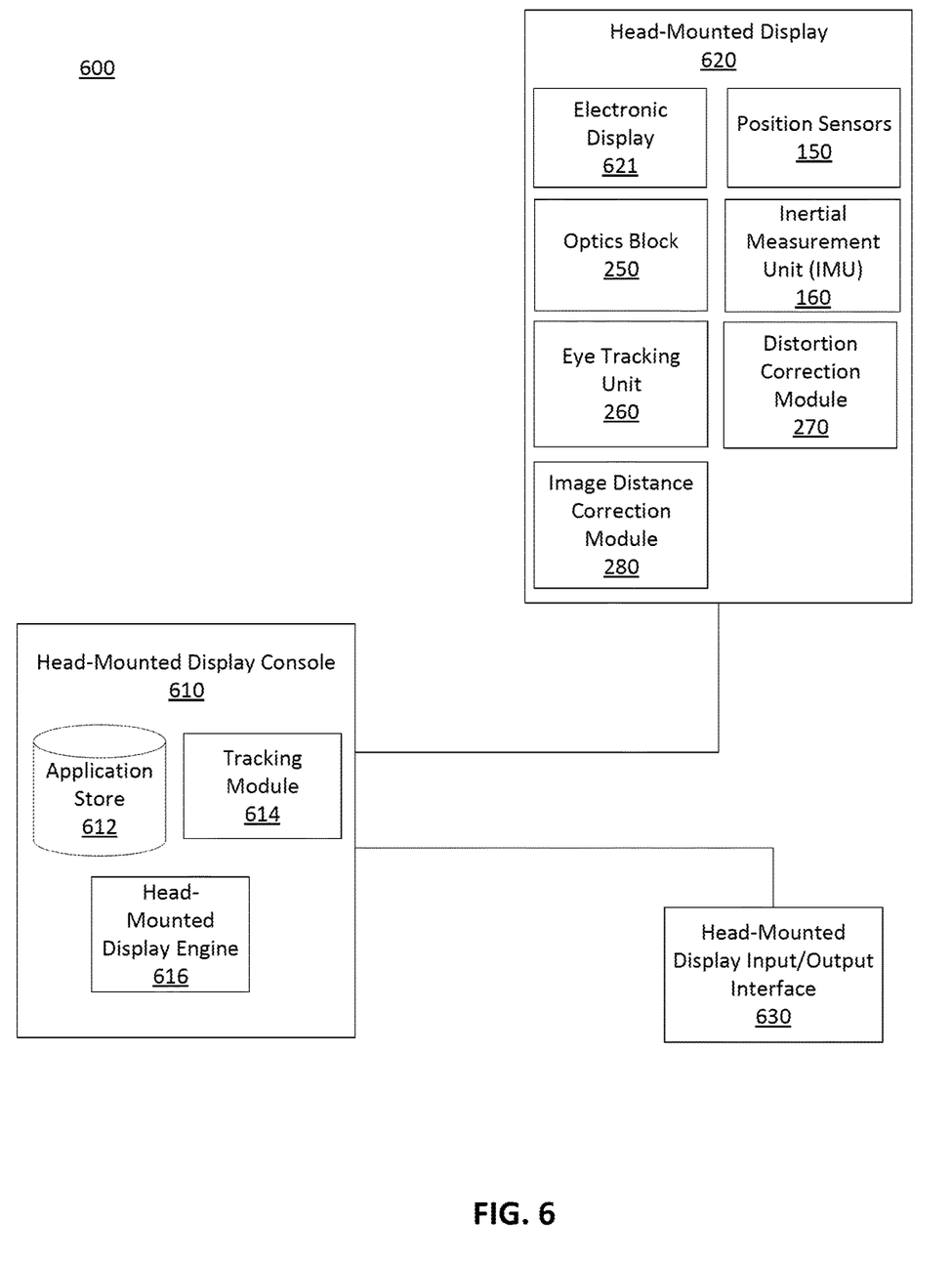
FIG. 6 is a block diagram of a HMD system, in accordance with an embodiment.

Turning now to a possible implementation of distortion correction in a HMD system, FIG. 6 is a block diagram of a HMD system 600. The HMD system 600 may operate in a VR system environment, an AR system environment, a MR system environment, or some combination thereof. The system 600 shown by FIG. 6 includes a HMD 620 and a HMD input interface 630 that are each coupled to a HMD console 610. While FIG. 6 shows an example system 600 including one HMD 620 and one HMD input interface 630, in other embodiments any number of these components may be included in the system 600. For example, there may be multiple HMDs 610, each having an associated HMD input/output interface (I/O interface) 630, and communicating with the HMD console 610. In alternative configurations, different and/or additional components may be included in the system environment 600. Similarly, functionality of one or more of the components can be distributed among the components in a different manner than is described here. For example, some or all of the functionality of the HMD console 610 may be contained within the HMD 620.

The HMD 620 is a head-mounted display that presents content to a user comprising virtual and/or augmented views of a physical, real-world environment with computer-generated elements (e.g., two-dimensional (2D) or 3D images, 2D or 3D video, sound, etc.). In some embodiments, the presented content includes audio that is presented via an external device (e.g., speakers and/or headphones) that receives audio information from the HMD 620, the console 610, or both, and presents audio data based on the audio information. Some embodiments of the HMD 620 are described in conjunction with FIGS. 1-3.

The HMD 620 includes an electronic display 621, an optics block 250, one or more position sensors 150, an inertial measurement unit (IMU) 160, an eye tracking unit 260, a distortion correction module 270, and an image distance correction module 280. Some embodiments of the HMD 620 have different components than those described here. Similarly, the functions can be distributed among other components in the HMD system 600 in a different manner than is described here.

The electronic display 621 displays 2D or 3D images to the user in accordance with data received from the console 610. In various embodiments, the electronic display 621 comprises a single electronic display panel or multiple electronic display panels (e.g., a display panel for each eye of a user). An electronic display panel may be, e.g., the display panel 240.

The optics block 250 magnifies received light from the electronic display 621, corrects optical errors associated with the image light, and the corrected image light is presented to a user of the HMD 620. The optics block 250 is an optical element, such as an aperture, a Fresnel lens, a convex lens, a concave lens, a filter, or any other suitable optical element that affects the image light emitted from the electronic display 621. Moreover, the optics block 250 may include combinations of different optical elements. In some embodiments, one or more of the optical elements in the optics block 250 may have one or more coatings, such as partial reflectors or anti-reflective coatings. The optics block 250 is described in further detail with regard to FIG. 2.

The IMU 160 is an electronic device that generates fast calibration data based on measurement signals received from one or more of the position sensors 150. A position sensor 150 generates one or more measurement signals in response to motion of the HMD 620. Examples of position sensors 150 include: one or more accelerometers, one or more gyroscopes, one or more magnetometers, another suitable type of sensor that detects motion, a type of sensor used for error correction of the IMU 160, or some combination thereof. The position sensor 150 is described in further detail with regard to FIG. 1.

Based on the one or more measurement signals from one or more position sensors 150, the IMU 160 generates fast calibration data indicating an estimated position of the HMD 620 relative to an initial position of the HMD 620. In some embodiments, the IMU 160 rapidly samples the measurement signals and calculates the estimated position of the HMD 620 from the sampled data. The IMU 160 is described in further detail with regard to FIG. 1.

The eye tracking unit 260 is a sensor that tracks the eye movement of a user of the HMD. The eye tracking unit 260 is described in further detail with regard to FIG. 2.

The distortion correction module 270 is structured to identify image distortions perceived by the eye 220, determine corresponding distortion values, and identify states of one or more elements of the HMD 620 that serve to correct this distortion, if the magnitude of one or more calculated distortion values is greater than a specified threshold distortion value. These steps are performed by the distortion correction module 270 based on its mode of operation.

The distortion correction module 270 can operate in one or more modes of operation. Two possible modes of operation of the distortion correction module 270 are the ray-tracing mode and the distortion map mode. The ray-tracing mode of operation of the distortion correction module 270 may use a ray-tracing program along with pre-determined specifications of the optics block 250, eye tracking information from the eye tracking unit 260, and state information for one or more of the electronic display 621 and the optics block 250 to calculate expected distortion values. Based on the magnitude of the calculated distortion values, the distortion correction module 270 may use the ray-tracing program to determine adjusted states for the one or more of the electronic display 621 and the optics block 250 such that distortion values are reduced to an acceptable level. The ray-tracing mode of operation of the distortion correction module 270 is described in greater detail with regard to FIG. 2.

The distortion map mode of operation of the distortion correction module 270 searches a pre-generated distortion map for eye tracking information from the eye tracking unit 260 and state information for one or more of electronic display 621 and the optics block 250 to determine expected distortion values. Based on the magnitude of the distortion values, the distortion correction module 270 may again reference the distortion map to determine adjusted states for the electronic display 621 and the optics block 250 such that the determined distortion values are reduced to an acceptable level. The distortion map mode of operation of the distortion correction module 270 is described in greater detail with regard to FIGS. 2 and 3.

State information for the HMD 620 as determined by the distortion correction module 270 is passed to the image distance correction module 280. The image distance correction module 280 is structured to adjust the states of one or more elements of the HMD 620 based on state information received from the distortion correction module 270. In some embodiments, the one or more elements of the HMD 620 adjusted by the image distance correction module 280 include the electronic display 621, the optics block 250, or both the electronic display 621 and the optics block 250.

In other embodiments, the functions of the HMD 620 described in FIG. 6 may be distributed among other components in the HMD system environment 600 in different manners. For example, some or all of the functionality provided by the distortion correction module 270 and/or the image distance correction module 280 may be performed by the HMD console 610. In alternative embodiments, the functionality provided by the distortion correction module 270 and/or the image distance correction module 280 may be split between the HMD 620 and the HMD console 610.

The HMD I/O interface 630 is a device that allows a user to send action requests to the HMD console 610. An action request is a request to perform a particular action. For example, an action request may be to start or end an application or to perform a particular action within the application. The HMD I/O interface 630 may include one or more input devices. Example input devices include: a keyboard, a mouse, a game controller, or any other suitable device for receiving action requests and communicating the received action requests to the HMD console 610. An action request received by the HMD I/O interface 630 is communicated to the HMD console 610, which performs an action corresponding to the action request. In some embodiments, the HMD I/O interface 630 may provide haptic feedback to the user in accordance with instructions received from the HMD console 610. For example, haptic feedback is provided when an action request is received, or the HMD console 610 communicates instructions to the HMD I/O interface 630 causing the HMD I/O interface 630 to generate haptic feedback when the HMD console 610 performs an action.

The HMD console 610 provides media to the HMD 620 for presentation to the user in accordance with information received from the HMD 620 and/or the HMD I/O interface 630. In the example shown in FIG. 6, the HMD console 610 includes an application store 612, a tracking module 614, and a HMD engine 616. Some embodiments of the HMD console 610 have different modules than those described in conjunction with FIG. 6. Similarly, the functions further described below may be distributed among components of the HMD console 610 in a different manner than is described here.

The application store 612 stores one or more applications for execution by the HMD console 610. An application is a group of instructions, that when executed by a processor, generates content for presentation to the user. Content generated by an application may be in response to inputs received from the user via movement of the HMD 620 or the HMD I/O interface 630. Examples of applications include: gaming applications, conferencing applications, video playback application, or other suitable applications.

The tracking module 614 calibrates the HMD system 600 using one or more calibration parameters and may adjust one or more calibration parameters to reduce error in determination of the position of the HMD 620. Moreover, calibration performed by the tracking module 614 also accounts for information received from the IMU 160. Additionally, if tracking of the HMD 620 is lost, the tracking module 614 re-calibrates some or all of the HMD system 600.

The tracking module 614 tracks movements of the HMD 620. The tracking module 614 determines positions of a reference point of the HMD 620 using position information from fast calibration information. Additionally, in some embodiments, the tracking module 614 may use portions of the fast calibration information to predict a future location of the HMD 620. Alternatively, the tracking module 614 may use depth information generated by the eye tracking unit 260 to track movements of the HMD 620. For example, the eye tracking unit 260 generates depth information of an object that is still as to the local area surrounding the HMD 620. Using the depth information, the tracing module 614 can determine movements of the object relative to the HMD 620, which is opposite to movements of the HMD 620 in the local area. The tracking module 614 provides the estimated or predicted future position of the HMD 620 to the HMD engine 616.

The HMD engine 616 executes applications within the system environment 100 and receives depth information, position information, acceleration information, velocity information, predicted future positions, or some combination thereof of the HMD 620 from the tracking module 614. Based on the received information, the HMD engine 616 determines content to provide to the HMD 620 for presentation to the user. For example, if the received depth information indicates that an object has moved further from the HMD 620, the HMD engine 616 generates content for the HMD 620 that mirrors the object's movement in an augmented reality environment. Additionally, the HMD engine 616 performs an action within an application executing on the HMD console 610 in response to an action request received from the HMD I/O interface 630 and provides feedback to the user that the action was performed. The provided feedback may be visual or audible feedback via the HMD 620 or haptic feedback via the HMD I/O interface 630.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   estimating one or more distortion values by inputting eye tracking information and a state of an HMD into an optical model, wherein the HMD includes a plurality of states, and each state is associated with a different distance between an optical element of the HMD and an electronic display of the HMD;
   determining an adjusted state of the HMD using one or more of the estimated distortion values, the eye tracking information, and the optical model, the adjusted state being different from the state; and
   adjusting a distance between the electronic display and the optical element in accordance with the adjusted state.

2. The method of claim 1, wherein determining an adjusted state of the HMD using one or more of the estimated distortion values, the eye tracking information, and the optical model, the adjusted state being different from the state, comprises:
- determining, using the optical model, a state of the HMD at which associated distortion values are less than a threshold distortion value.

3. The method of claim 1, further comprising:
- mapping values for one or more types of distortion to the eye tracking information for each of the plurality of states of the HMD.

4. The method of claim 1, further comprising:
- dynamically determining values for one or more types of distortion using the eye tracking information for each of the plurality of states of the HMD.

5. The method of claim 4, wherein dynamically determining the values for the one or more types of distortion using the eye tracking information for each of the plurality of states of the HMD is performed using a ray tracing program.

6. The method of claim 1, further comprising:
- pre-distorting the images presented by the electronic display to reduce the estimated distortion values based on the eye tracking information.

7. The method of claim 1, wherein adjusting the distance between the electronic display and the optical element in accordance with the adjusted state, comprises:
- adjusting a position of the optical element relative to the electronic display.

8. The method of claim 1, wherein adjusting the distance between the electronic display and the optical element in accordance with the adjusted state, comprises:
- adjusting a position of the electronic display relative to the optical element.

9. A non-transitory computer readable medium configured to store program code instructions, when executed by a processor, cause the processor to perform steps comprising:
- estimating one or more distortion values by inputting eye tracking information and a state of an HMD into an optical model, wherein the HMD includes a plurality of states, and each state is associated with a different distance between an optical element of the HMD and an electronic display of the HMD;
- determining an adjusted state of the HMD using one or more of the estimated distortion values, the eye tracking information, and the optical model, the adjusted state being different from the state; and
- adjusting a distance between the electronic display and the optical element in accordance with the adjusted state.

10. The computer readable medium of claim 9, wherein determining an adjusted state of the HMD using one or more of the estimated distortion values, the eye tracking information, and the optical model, the adjusted state being different from the state, comprises:
- determining, using the optical model, a state of the HMD at which associated distortion values are less than a threshold distortion value.

11. The computer readable medium of claim 9, wherein the steps further comprise:
- mapping values for one or more types of distortion to the eye tracking information for each of the plurality of states of the HMD.

12. The computer readable medium of claim 9, wherein the steps further comprise:
- dynamically determining values for one or more types of distortion using the eye tracking information for each of the plurality of states of the HMD.

13. The computer readable medium of claim 12, wherein dynamically determining the values for the one or more types of distortion using the eye tracking information for each of the plurality of states of the HMD is performed using a ray tracing program.

14. The computer readable medium of claim 9, wherein the steps further comprise:
- pre-distorting the images presented by the electronic display to reduce the estimated distortion values based on the eye tracking information.

15. The computer readable medium of claim 9, wherein adjusting the distance between the electronic display and the optical element in accordance with the adjusted state, comprises:
- adjusting a position of the optical element relative to the electronic display.

16. The computer readable medium of claim 9, wherein adjusting the distance between the electronic display and the optical element in accordance with the adjusted state, comprises:
- adjusting a position of the electronic display relative to the optical element.

17. A head-mounted display (HMD) comprising:
- an electronic display configured to present images to a user;
- an optics block configured to provide the images presented by the electronic display to the user;
- an eye tracking unit configured to determine eye tracking information for one or more eyes of the user as the user views the images;
- a distortion correction module configured to:
  - estimate one or more distortion values by inputting the eye tracking information and a state of the HMD into an optical model, wherein the HMD includes a plurality of states, and each state is associated with a different distance between an optical element of the HMD and the electronic display;
  - determining an adjusted state of the HMD using one or more of the estimated distortion values, the eye tracking information, and the optical model, the adjusted state being different from the state; and
  - adjusting a distance between the electronic display and the optical element in accordance with the adjusted state.

18. The HMD of claim 17, wherein the distortion correction module is further configured to:
- determine, using the optical model, a state of the HMD at which associated distortion values are less than a threshold distortion value.

19. The HMD of claim 17, wherein the distortion correction module is further configured to:
- map values for one or more types of distortion to the eye tracking information for each of the plurality of states of the HMD.

20. The HMD of claim 17, wherein the distortion correction module is further configured to:
- dynamically determine values for one or more types of distortion using the eye tracking information for each of the plurality of states of the HMD.

* * * * *